(12) United States Patent
Heertjes (10) Patent No.: US 7,818,073 B2
(45) Date of Patent: Oct. 19, 2010

(54) METHOD FOR OBTAINING IMPROVED FEEDFORWARD DATA, A LITHOGRAPHIC APPARATUS FOR CARRYING OUT THE METHOD AND A DEVICE MANUFACTURING METHOD

(75) Inventor: Marcel François Heertjes, Best (NL)

(73) Assignees: ASML Netherlands B.V., Veldhoven (NL); Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 11/407,337

(22) Filed: Apr. 20, 2006

(65) Prior Publication Data

US 2007/0250187 A1    Oct. 25, 2007

(51) Int. Cl.
*G05B 13/02*    (2006.01)
*G05B 19/00*    (2006.01)

(52) U.S. Cl. ............................. 700/45; 700/63; 700/31; 700/121; 318/611; 318/638

(58) Field of Classification Search .................... 700/1, 700/28, 44–45, 121; 355/53; 318/135
See application file for complete search history.

(56) References Cited

U.S. PATENT DOCUMENTS

| | | | | |
|---|---|---|---|---|
| 3,795,799 A | * | 3/1974 | Courtiol | 700/30 |
| 5,521,036 A | * | 5/1996 | Iwamoto et al. | 430/22 |
| 5,757,149 A | * | 5/1998 | Sato et al. | 318/135 |
| 5,831,739 A | * | 11/1998 | Ota | 356/401 |
| 6,114,670 A | * | 9/2000 | Erickson et al. | 219/497 |
| 6,260,282 B1 | * | 7/2001 | Yuan et al. | 33/1 M |
| 6,355,994 B1 | * | 3/2002 | Andeen et al. | 310/15 |

(Continued)

FOREIGN PATENT DOCUMENTS

| EP | 1265106 A2 | * | 12/2002 |
|---|---|---|---|
| EP | 1480093 A1 | * | 11/2004 |
| WO | WO 2004074951 A1 | * | 9/2004 |

OTHER PUBLICATIONS

Bristow, D.A.; Tharayil, M.; Alleyne, A.G., "A survey of iterative learning control," Control Systems Magazine, IEEE, vol. 26, No. 3, pp. 96-114, Jun. 2006 (state of art review for background only).*

(Continued)

*Primary Examiner*—Albert DeCady
*Assistant Examiner*—Dave Robertson
(74) *Attorney, Agent, or Firm*—Pillsbury Winthrop Shaw Pittman LLP (57) ABSTRACT

A method of obtaining improved feedforward data for a feed-forward control system to move a component through a setpoint profile is presented. The setpoint profile includes a plurality of target states of the component each to be substantially attained at one of a corresponding sequence of target times. The method includes moving the component with the feedforward control system according to the setpoint profile using a first set of feedforward data; measuring a state of the component at a plurality of times during the movement; comparing the measured states with corresponding target states defined by the setpoint profile to obtain a set of errors; filtering the set of errors with a non-linear filter; generating improved feedforward data based on the filtered errors, the improved feedforward data being usable by the feedforward control system to move the component more accurately through the setpoint profile.

16 Claims, 9 Drawing Sheets

U.S. PATENT DOCUMENTS

| | | | |
|---|---|---|---|
| 6,453,206 | B1* | 9/2002 | Soraghan et al. ............... 700/48 |
| 6,694,498 | B2* | 2/2004 | Conrad et al. ................... 716/4 |
| 6,751,602 | B2* | 6/2004 | Kotoulas et al. ............... 706/23 |
| 6,856,191 | B2* | 2/2005 | Bartuni ....................... 327/552 |
| 6,904,422 | B2* | 6/2005 | Calise et al. .................. 706/23 |
| 6,949,844 | B2* | 9/2005 | Cahill et al. ............. 310/12.02 |
| 7,181,296 | B2* | 2/2007 | Rotariu et al. ................ 700/44 |
| 7,199,878 | B2* | 4/2007 | Takeishi ..................... 356/399 |
| 7,345,448 | B2* | 3/2008 | Watt et al. ................... 318/632 |
| 7,498,760 | B2* | 3/2009 | Akiyama .................... 318/632 |
| 7,627,403 | B2* | 12/2009 | Miller et al. ..................... 701/3 |
| 2003/0043354 | A1* | 3/2003 | Butler ......................... 355/53 |
| 2004/0238758 | A1* | 12/2004 | Antonius Theodorus Dams ..................... 250/491.1 |
| 2005/0043834 | A1* | 2/2005 | Rotariu et al. ................ 700/95 |
| 2005/0231706 | A1* | 10/2005 | Yang et al. .................... 355/72 |

OTHER PUBLICATIONS

Helfrich B E, Lee C, Bristow D A, Xiaohui X, Dong J, Alleyne A G and Salapaka S 2008 Combined Hoo-feedback and iterative learning control design with application to nanopositioning systems Proc. American Control Conf. (Seattle, WA, June) pp. 3893-3900.*

S. Joe Qin, Thomas A. Badgwell, A survey of industrial model predictive control technology, Control Engineering Practice, vol. 11, Issue 7, Jul. 2003, pp. 733-764.*

I. Rotariu, R.M.L. Ellenbroek, G.E. van Baars, M. Steinbuch, "Iterative Learning Control for variable setpoints, applied to a motion system", European Control Conference 2003, pp. 1-8.*

Bin Yao, Li Xu, Adaptive robust motion control of linear motors for precision manufacturing, Mechatronics, vol. 12, Issue 4, May 2002, pp. 595-616.*

* cited by examiner

METHOD FOR OBTAINING IMPROVED FEEDFORWARD DATA, A LITHOGRAPHIC APPARATUS FOR CARRYING OUT THE METHOD AND A DEVICE MANUFACTURING METHOD

FIELD

The present invention relates to a method for obtaining improved feedforward data for a system for moving a component through a setpoint profile and a lithographic apparatus for carrying out the method and a device manufacturing method using a lithographic apparatus and the improved feedforward data.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. including part of, one, or several dies).on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at once, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

An important factor in lithographic apparatus performance is the precision with which components to be moved during exposure, such as the reticle stage (patterning device table) containing the patterns needed for illumination and the substrate table containing the substrates to be illuminated, can be displaced. Under feedback control, the movement of components is controlled using standard PID-based control systems. However, to obtain nano-scale position accuracy, with settling times of the order of milliseconds or lower, feedforward control may be desirable.

In addition to the commonly used acceleration-, jerk-, and even snap-based feedforward control designs (i.e. designs based on acceleration and higher order derivatives of position with respect to time), the application of iterative learning control to obtain short settling times has been suggested. This approach has the benefit that only limited system knowledge is required to implement the feedforward control with high accuracy. The method is based on iteratively learning a feedforward signal or "force" that minimizes a measured error signal (defined as a measured deviation of the state of a component being moved from a setpoint profile defining an intended time evolution of the state) over a number of trial "runs" of the component through the setpoint profile. When the learned signal is applied to the system or process, it effectively counteracts contributions to the error signal that occur repeatedly in different trials ("repetitive contributions").

During learning of the feedforward signal, the measured error signal during a particular trial may contain non-repetitive contributions, like random noise, which differ from trial to trial. Such contributions may cause the learned feedforward signal to inject noise into the system. This may lead to a decrease in performance and/or limit the improvement obtained using iterative learning-based control. The efficiency of the learning process itself depends on the gain of the learning algorithm, which may be limited by its stability.

SUMMARY

It is desirable to provide a system for improving the way iteratively learned data is obtained.

According to an embodiment of the invention, there is provided a method of obtaining improved feedforward data for a feedforward control system for moving a component through a setpoint profile, the setpoint profile including a plurality of target states of the component each to be substantially attained at one of a corresponding sequence of target times, the method including: a) using the feedforward control system to move the component according to the setpoint profile using a first set of feedforward data; b)measuring the state of the component at a plurality of times during the movement; c) comparing the measured states with corresponding target states defined by the setpoint profile in order to obtain a set of errors; d) applying a non-linear filter to the set of errors; e) generating improved feedforward data on the basis of the filtered errors, the improved feedforward data being usable by the feedforward control system to move the component more accurately through the setpoint profile.

According to a further embodiment of the invention, there is provided a lithographic projection apparatus arranged to project a pattern from a patterning device onto a substrate, including: a movable support for a component; and a system to move the movable support through a setpoint profile including a plurality of target states of the movable support, each to be substantially attained at one of a corresponding sequence of target times, the system including: a displacement device to move the movable support according to the setpoint profile; a feedforward control system to control the displacement device using a first set of feedforward data; a measuring system to measure the state of the component at a plurality of times during the movement; a comparison device to compare the measured states with corresponding target states in order to obtain a set of errors; a filter configured to filter the set of errors; and a feedforward data generating device arranged to generate modified feedforward data on the basis of the filtered set of errors, the modified feedforward data being usable by the feedforward control system to control the displacement device to more accurately move the movable support through the setpoint profile.

According to a further embodiment of the invention, there is provided a device manufacturing method, including: using a lithographic projection apparatus to project a pattern from a patterning device onto a substrate; providing a movable support for a component of the lithographic apparatus; using a feedforward control system to move the movable support through a setpoint profile using a first set of feedforward data, the setpoint profile including a plurality of target states of the movable support, each to be substantially attained at one of a corresponding sequence of target times; measuring the state of the component at a plurality of times during the movement; comparing the measured states with corresponding target states in order to obtain a set of errors; applying a filter to the set of errors; generating improved feedforward data on the basis of the filtered set of errors; and moving the movable support through the setpoint profile using the improved feedforward data.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
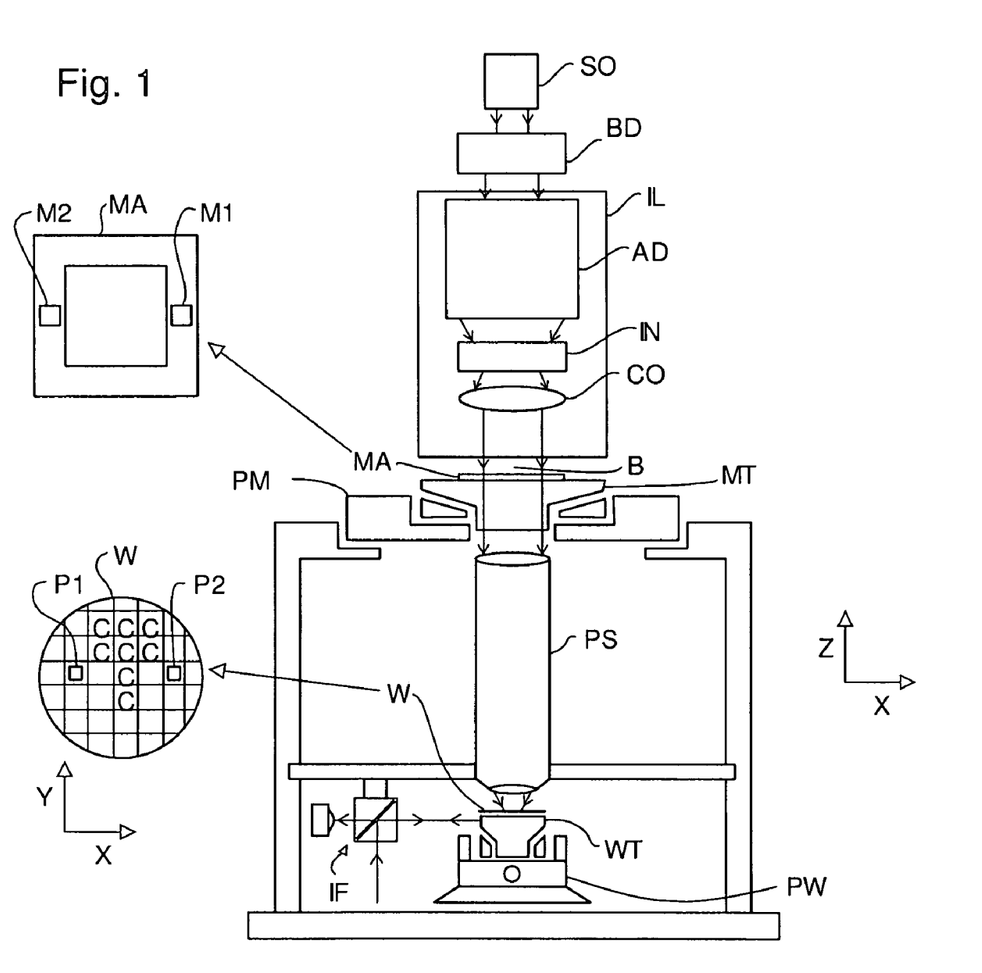
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam B (e.g. UV radiation or EUV radiation) a support structure (e.g. a mask table) MT constructed to support a patterning device (e.g. a mask) MA and connected to a first positioner PM configured to accurately position the patterning device in accordance with certain parameters; a substrate table (e.g. a wafer table) WT constructed to hold a substrate (e.g. a resist-coated wafer) W and connected to a second positioner PW configured to accurately position the substrate in accordance with certain parameters; and a projection system (e.g. a refractive projection lens system) PS configured to project a pattern imparted to the radiation beam B by patterning device MA onto a target portion C (e.g. including one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure supports, i.e. bears the weight of, the patterning device. It holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioner PW and position sensor IF (e.g. an interferometric device, linear encoder or capacitive sensor), the substrate table WT can be moved accurately, e.g. so as to position different target portions C in the path of the radiation beam B. Similarly, the first positioner PM and another position sensor (which is not explicitly depicted in FIG. 1) can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the mask table MT and the substrate table WT are scanned synchronously while a pattern imparted to the radiation beam is projected onto a target portion C (i.e. a single dynamic exposure). The velocity and direction of the substrate table WT relative to the mask table MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2A:
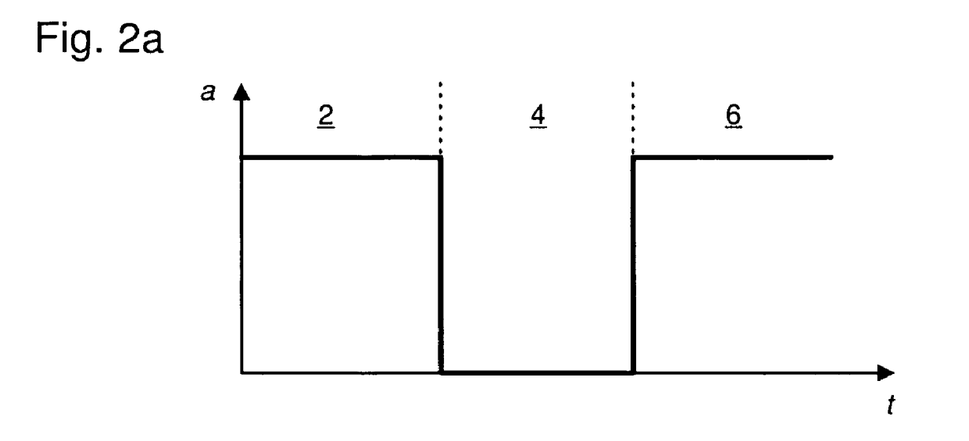
FIGS. 2a-c depict a setpoint profile defined in terms of, respectively, an acceleration profile, a velocity profile and a position profile.
Figure 2B:
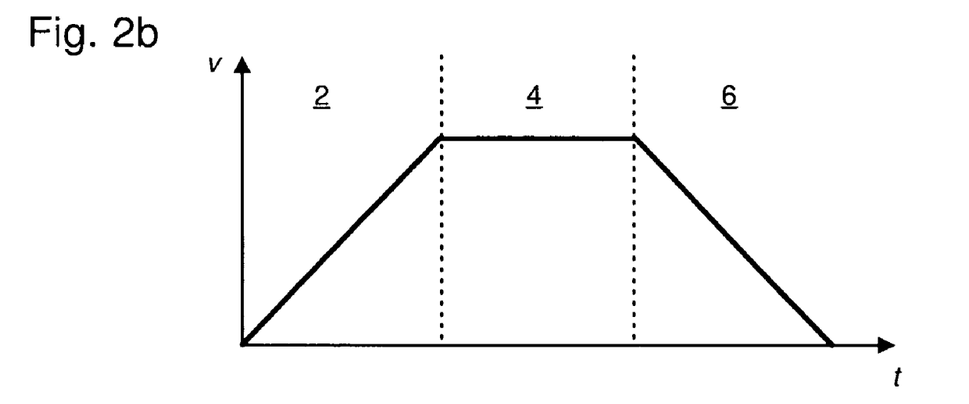
Figure 2C:
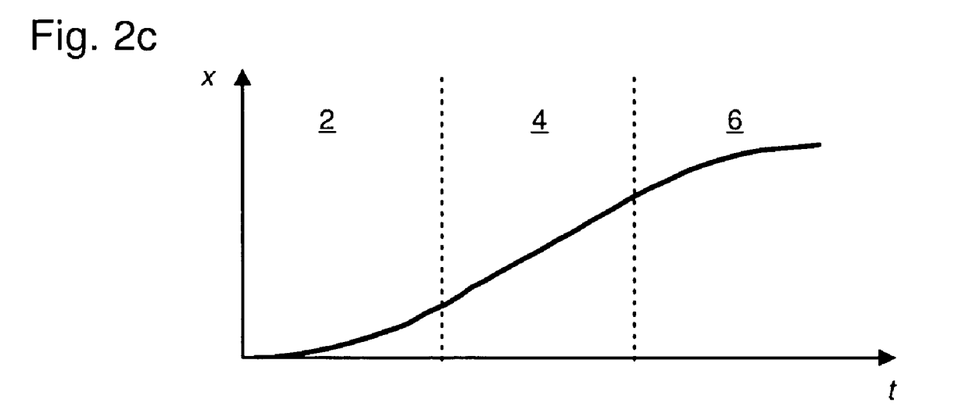

FIGS. 2a-c illustrates what is meant by a setpoint profile. Three schematic graphs are shown representing (from top to bottom) the acceleration (FIG. 2a), velocity (FIG. 2b) and position (FIG. 2c) of a component while it is being moved through a simplified setpoint profile. The setpoint profile, in this example, includes three distinct regimes: an acceleration phase 2, a constant velocity phase 4, and a deceleration phase 6. In general, the setpoint profile may be characterized by a sequence of target states that the component is intended to reach at particular target times.

As mentioned above, accurate control of components to be moved may be achieved using a feedforward control system. The feedforward signal in such systems may be based either on explicit system knowledge (based on factors such as the mass of the component to be moved) and/or on feedforward data derived from previous measurements. For example, an iterative learning scheme may be employed.

As explained above, iteratively learned feedforward data is only effective in counteracting errors that arise each time the component to be controlled is moved through the setpoint profile. Non-repetitive contributions, such as random noise, are not dealt with by the iterative learning control algorithm and may even be amplified during iterative learning. This may occur as the control algorithm tries to adapt the feedforward data to counteract the non-repetitive component even though it will not occur in subsequent runs. In existing systems, high learning gain (i.e. rapid convergence) may not be achieved without compromising the stability of the learning algorithm: either the system is stable but takes a long time to converge or the system converges quickly but is unstable.

Figure 3:
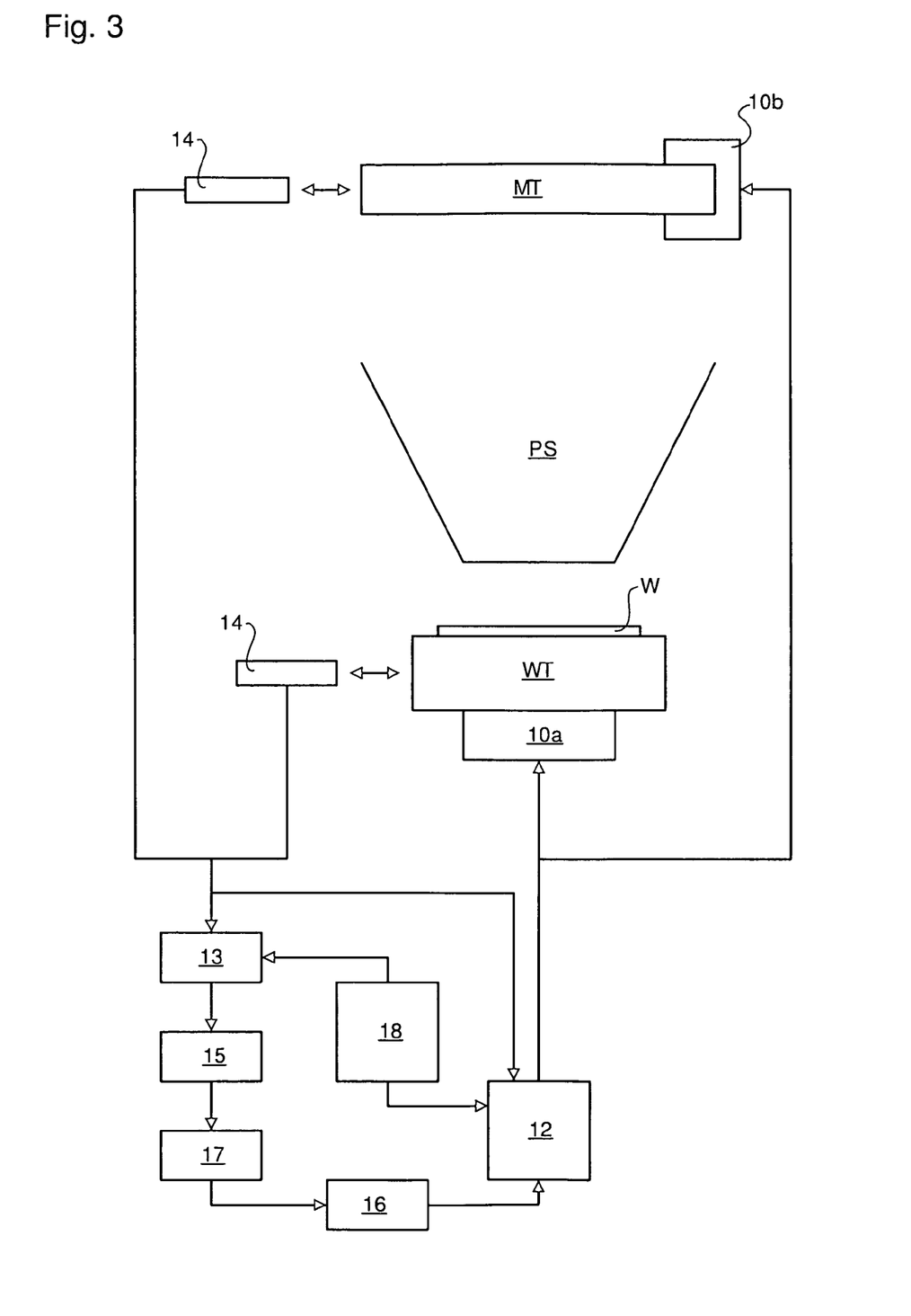
FIG. 3 discloses a lithography apparatus with a feedforward control system to carry out a method according to an embodiment of the invention.

FIG. 3 illustrates a lithographic apparatus which may be used to derive iteratively learned feedforward data and to move patterning devices and/or substrates using a control system which receives the learned data as input. According to this arrangement, a substrate table WT and/or a patterning device table MT are/is arranged to be moved through a setpoint profile. A displacement device 10a or 10b is provided to move the substrate table WT or patterning device table MT respectively under the control of a control signal provided by a feedforward control system 12. The setpoint profile is available to the control system via device 18, which may be connected to an input device such as an external computer, or a storage device (not shown).

In the embodiment shown, the error in the state of the patterning device table MT or substrate table WT (for example an error in the position, velocity, or acceleration relative to what is required by the setpoint profile being followed) is derived by error-determining device 13. The error-determining device 13 is arranged to receive input from measuring devices 14, which measure the state of the patterning device table MT and/or substrate table WT and compare these measurements with the setpoint profile input by device 18. Where the setpoint profile is defined as a sequence of states to be obtained at a correspondence sequence of target times, the error-determining device may be configured to make comparisons with the measured states at times corresponding to one or more of the target times or, alternatively, use interpolation to determine target states for times occurring between particular target times. Once a set of errors has been determined by the error-determining device 13, the set is passed to non-linear filter 15 (the operation of which will be described in further detail below), which acts to reduce the proportion of non-repetitive components. The filtered error data is then passed to the feedforward signal modifier 17 which generates a modified feedforward signal on the basis of the filtered set of errors. The modified feedforward signal is then passed to storage device 16 where it will be available for use as a feedforward signal in subsequent runs by the control system 12. The operation of the control system 12 is described in more detail below with reference to FIG. 5.

Figure 4:
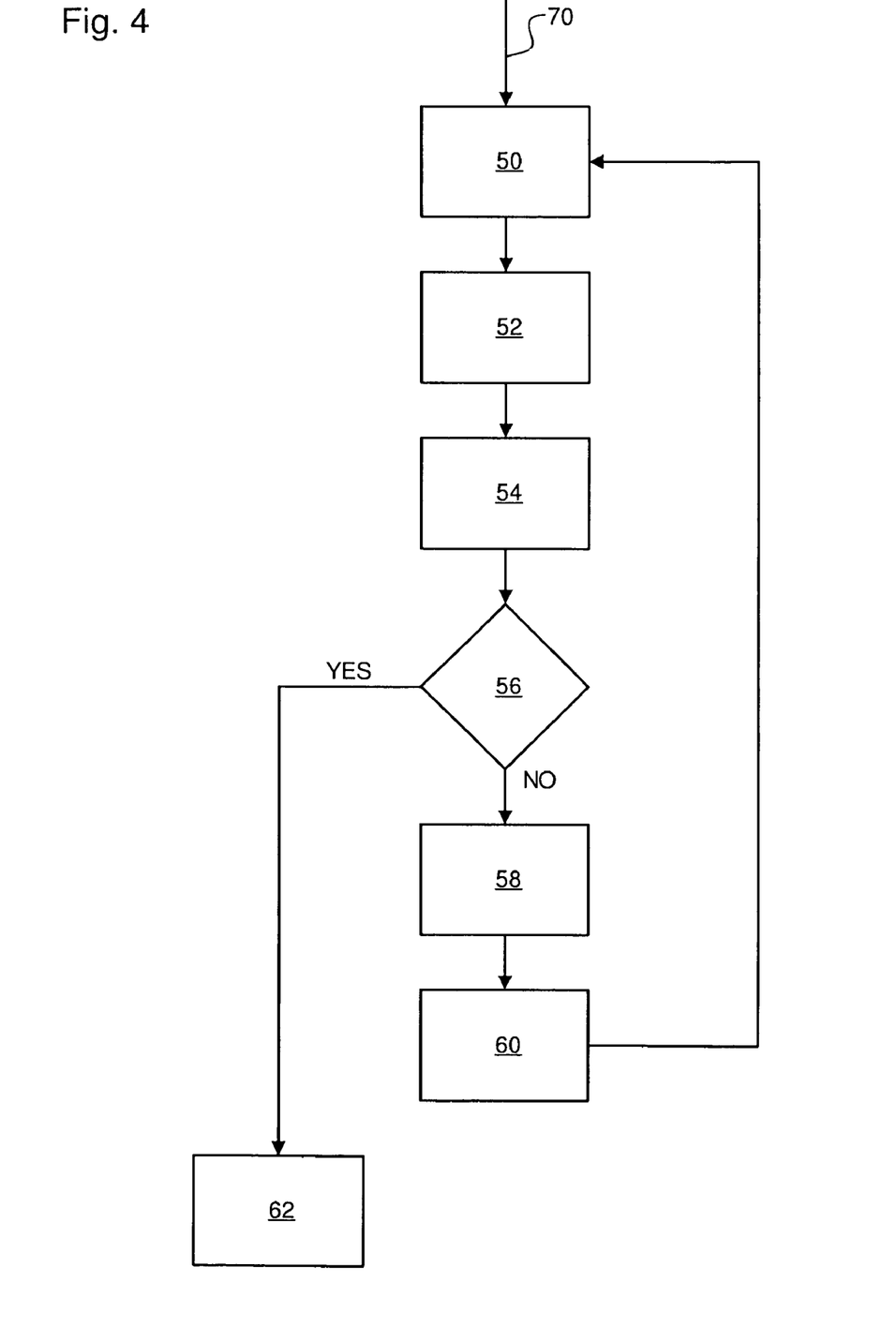
FIG. 4 depicts a method according to an embodiment of the invention in block diagram form.

FIG. 4 illustrates a method for dealing with the propagation/amplification of noise present in the considered error signals and, in particular, propagation/amplification by the iterative learning control algorithm. In step 50, a component to be controlled is moved using a feedforward control system through a setpoint profile according to a first set of feedforward data 70. During this movement, the state of the component is measured at a plurality of times (box 52). In step 54, a comparison is made between the measured states and corresponding target states derived from the setpoint profile in order to obtain a set of errors. The set of errors is compared with a threshold condition, in step 56. If the condition is satisfied ("YES"), the process stops and the current feedforward data is output as iteratively learned feedforward data to be used in future runs (box 62). If the threshold condition is not satisfied ("NO"), the learning process continues (to box 58).

The threshold condition defines when the errors have fallen within acceptable bounds and may be defined in a number of ways. For example, the threshold condition may be deemed met when all of the errors in the set of errors fall below a predetermined target threshold. Alternatively, the condition may be deemed satisfied when a predetermined subset of the set of errors falls below a predetermined target threshold or a set of predetermined target thresholds, corresponding to the subset of errors considered. For this purpose, the entire set of errors may also be used as an alternative to a subset.

In step 58, a non-linear filter, for example an amplitude-dependent filter, is applied to the set of errors. On the basis of the filtered errors, a modified feedforward data set is then generated (box 60). This modified feedforward data set is then used by the feedforward control system to move the component through the setpoint profile a second time. The process is then repeated until the condition tested in box 56 is satisfied and the latest version of the modified feedforward data is then output (box 62).

According to an embodiment of the invention, the filter 58 is chosen to have a deadzone nonlinearity. This choice of filter is based on the insight that in many circumstances the noise in the considered error signal will be small in amplitude, at least in comparison with those parts of the error signal that should be handled by the learning control algorithm to improve performance. That is, random noise can be distinguished from repetitive contributions to the signal, which are typically related to physical characteristics of the particular apparatus being used, based on an amplitude characterization. For example, a dead zone filter (or other non-linear filter) may be used which has the effect that the smaller the amplitude of the signal contribution, the less that contribution is subjected to the learning process. Two limiting situations may occur: i) if a component lies inside the deadzone length (or a threshold amplitude) it is not subjected to learning at all (i.e. it is filtered out), and ii) if a component is much larger than the deadzone length, it is fully subjected to learning. For any component in between these two limits, the amount of learning it receives is scaled (for example, according to the function $\phi(x)$ given below).

Filters that operate based on other principles of distinguishing between repetitive and non-repetitive contributions may also be used. For example, more sophisticated amplitude-dependent filters may be used or even filters that do not depend primarily on amplitude-characterization of non-repetitive contributions. For example, frequency characterization may be used. More specifically, a filter may be based on spectral analysis, for example wavelet analysis. Here, the error signal would be decomposed in discrete frequency banks/bands where the deadzone non-linearity can act on each of these frequency banks separately. As a result, frequency banks can be subjected to different amounts of learning.

More generally, an important property of the filter is that it reduces the extent to which non-repetitive contributions are present in the filtered set of errors.

The filtering step 58 aims to ensure that only learnable contributions in the error signal are passed on through the iterative learning control algorithm. Signals which are assumed to represent non-repetitive noises, are not passed on through the algorithm (or at least are passed on to a lesser extent). As a consequence, the contribution of non-repetitive noise to the learned force is minimized, thus reducing the level of noise applied to the system "dynamics", e.g. the operation of displacement devices 10a, 10b (by erroneously influencing the operation of the control system 12).

Particular benefits of a dead zone filter characteristic include that:

i) there is a separation between time intervals where the signal exceeds the upper noise band of the filter, indicated with $\delta$, and time intervals where it does not (this means that noise amplification through learning is limited only to those time intervals where the signal exceed the upper noise band), and ii) the noise band is subtracted from the error signal such that it is not affected by the learning algorithm (as a result, a much larger learning gain can be applied which induces a much larger convergence speed without having the stability problems of the learning algorithm).

A particular example of a dead zone filter is described in more detail below but other forms of filter, for example with more complex input-output relations, may also be designed that have the above two properties.

Figure 5:
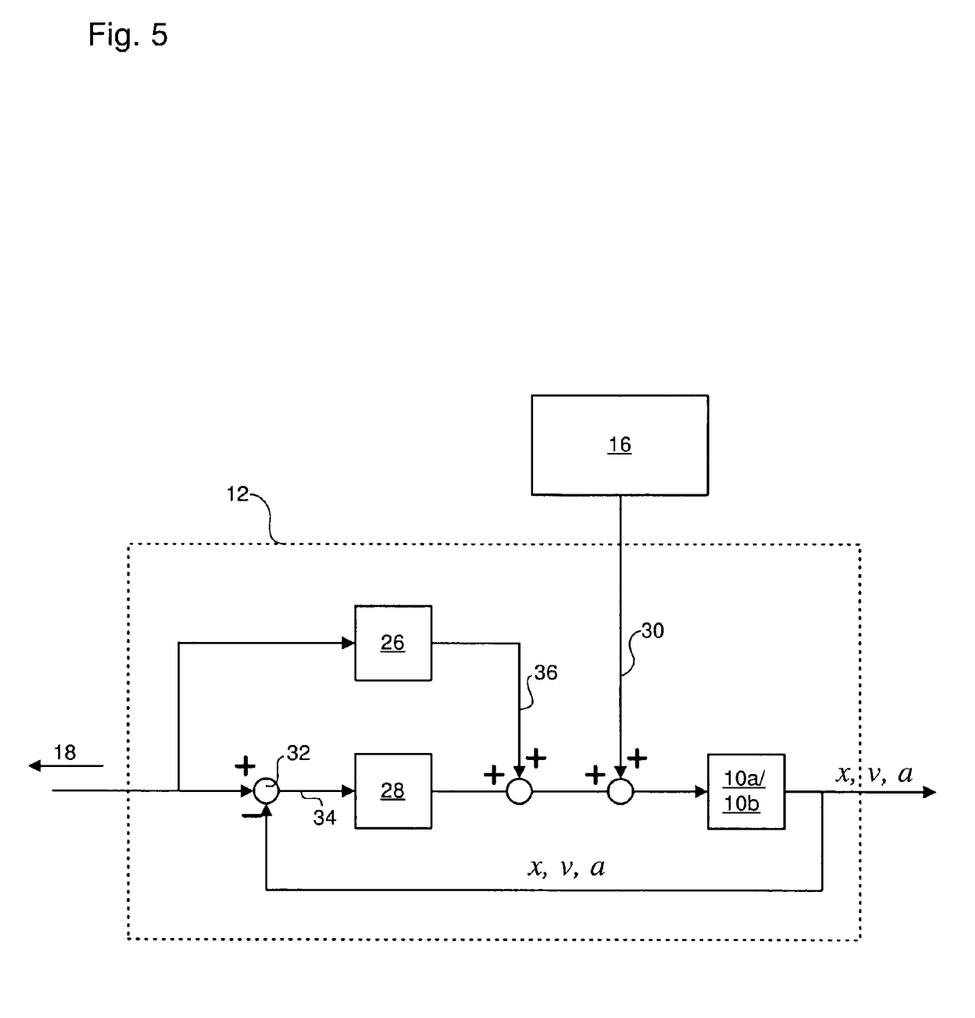
FIG. 5 depicts the feedforward control system of FIG. 3 in more detail.

FIG. 5 illustrates in general how the feedforward control system 12 may be configured to operate. At point 32, a setpoint profile signal from the setpoint profile device 18 is compared with a measured position signal of the component to be moved (in the case of the embodiment of FIG. 3, this signal will be provided by one or both of the measuring devices 14) and an error signal 34 is forwarded to controller 28. This feedback control is desirable to account for non-repetitive disturbances and any mismatch or time offset in the applied setpoint feedforward. The output from controller 28 is added to an inertial feedforward signal 36 and to a learned feedforward signal 30 from device 16. The inertial feedforward signal 36 is derived by block 26 from input setpoint data and is designed to take into account known physical properties of the system in question that are relevant to determine suitable forces to cause the controlled component to follow the setpoint profile, such as the mass of the substrate table WT or mask table MT and associated components. The resultant signal is passed to the displacement device 10a/10b which effects a change in the position x, velocity v and/or acceleration a of the component to be moved.

Figure 6:
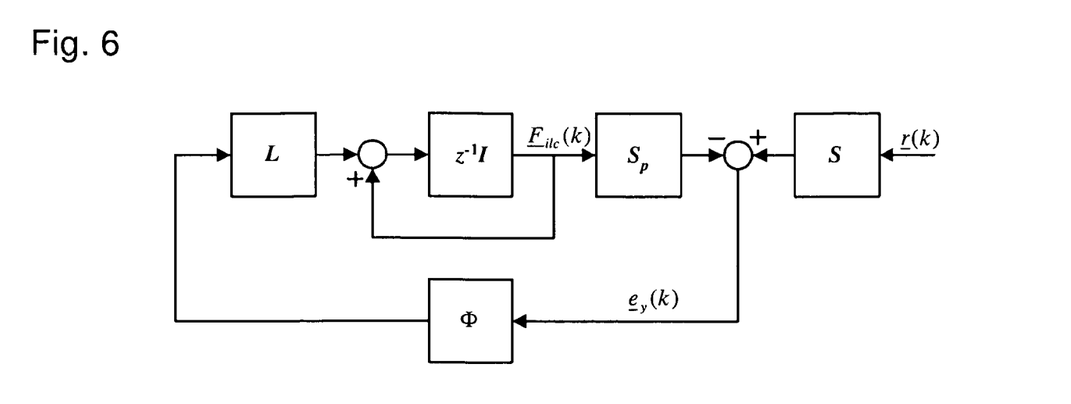
FIG. 6 depicts an iterative learning control scheme.

A more detailed example of an iterative learning algorithm that may be used to derive the data for device 16 is shown in block diagram representation in FIG. 6. Here $e_y(k)$ represents an n-sample error colon (an array of data points, which have been sampled at a specific sampling frequency, for example 5 kHz) for the k-th iteration with $e_y(0)=e_{yo}$, $\underline{F}ilc(k)$ represents an n-sample colon of learned feedforward data or "control forces" with $Filc(0)=\underline{0}$, $\underline{L}$ represents a learning gain matrix, the learning gain being given by $\underline{L}\Phi$ (which has a linear part contained in $\underline{L}$ and a nonlinear part contained in $\Phi$), $z^{-1}$ a one-sample time delay in a z-transform notation, I a unitary matrix, and Sp a so-called Toeplitz matrix representing the closed loop process sensitivity dynamics. Basically, Sp describes the effect of a setpoint position signal r on the closed-loop error signal e, $\underline{L}\Phi$ the learning gain, i.e. the gain used to reduce this error, and $z^{-1}I$ is part of an update mechanism needed to update the feedforward signal to be constructed.

The algorithm now works as follows. Starting with an array of collected errors during a learning setpoint profile (boxes 50, 52, 54 of FIG. 4) the array of errors is filtered by filtering function $\phi$ (box 58 of FIG. 4) to the array. An array of corrective feedforward forces is computed by multiplying the filtered error array with the learning gain matrix $\underline{L}$(box 60 of FIG. 4). In a subsequent trial run, the same learning setpoint profile is followed but now with the corrective feedforward forces from the previous run (being applied) to the system. This will, generally, yield smaller errors than before but due to the finite gain constraints of $\underline{L}$ the errors will not equal zero. Therefore the resulting errors will again be filtered by $\Phi$ and multiplied with $\underline{L}$ giving an additional array of feedforward forces which will be added to the existing array of feedforward forces. The adapted array of feedforward forces is applied to the system in a third run (again under the same learning profile) and so on. This procedure is repeated run after run until sufficient convergence of either the resulting array of errors or the array of applied feedforward forces (box 56 of FIG. 4) is achieved.

The feedforward data is synchronized with the setpoint profile exactly in the same way as it is obtained during learning; in general, the corrective forces represented by the generated feedforward data should be matched with the errors that they should compensate for.

The matrix $\Phi(\underline{e}_y(i))$ represents an embodiment of the invention, i.e. an amplitude-dependent filter matrix which is applied on the input $\underline{e}_y(i)$ and which is used to avoid the injection of noise from the error measurement into the feedback loop via the learning force $\underline{F}_{ilc}$. Its definition is as follows:

$$\Phi(\underline{e}_y) = \begin{bmatrix} \phi(\underline{e}_y(1)) & 0 & \cdots & 0 \\ 0 & \phi(\underline{e}_y(2)) & \cdots & 0 \\ 0 & \vdots & \ddots & \vdots \\ 0 & 0 & \cdots & \phi(\underline{e}_y(n)) \end{bmatrix}$$

with $$\phi(x) = \varepsilon(x) - \frac{\delta\varepsilon(x)}{|x|}$$

and $$\varepsilon(x) = \begin{cases} 1, & \text{if } |x| \geq \delta \\ 0, & \text{if } |x| < \delta. \end{cases}$$

Figure 7:
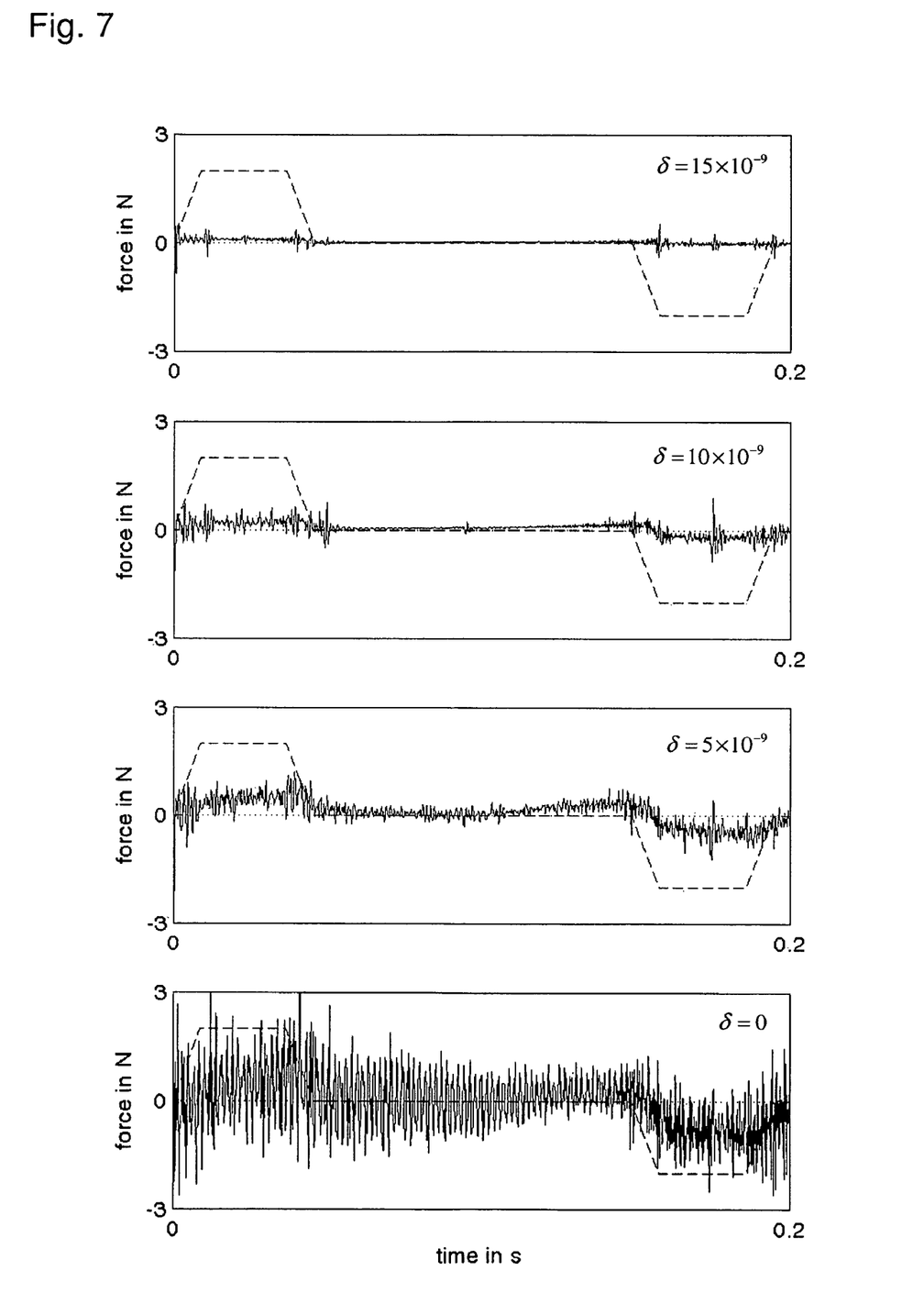
FIG. 7 depicts graphs showing learned feedforward signals obtained for different strengths of filter.
Figure 8:
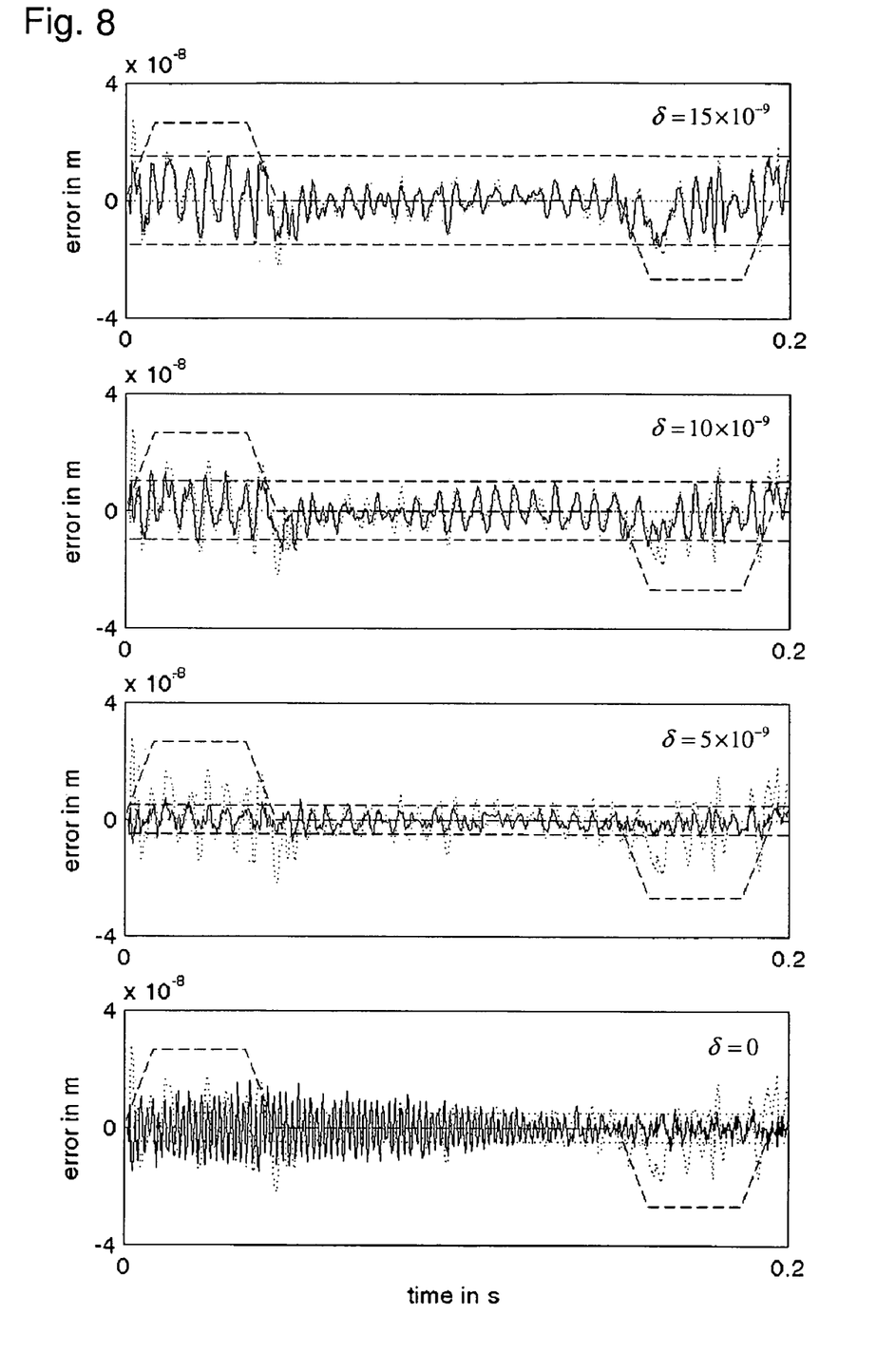
FIG. 8 depicts graphs corresponding to those in FIG. 7 showing measured errors for different strengths of filter.

That is, all measured error entries in $\underline{e}_y$—the trial of initial measured error signals—that are bounded in absolute value by a threshold value $\delta$ are assumed to be noise contributions and, therefore, are not subjected to learning. The choice for $\delta$ is motivated by the fact that merely contributions p which in absolute value exceed the noise level $\delta$ are handled by the learning algorithm. For example for an error component $\underline{e}_y(i)=\delta+p$, with p greater than zero, it follows that the filtered error component $$\phi(e_y(i)) \cdot e_y(i) = \phi(\delta+p) = \frac{p}{\delta+p}(\delta+p) = p$$

i.e. the learning control algorithm is not exposed to any input from inside the predefined noise band $\delta$. The result is shown in FIGS. 7 and 8 for four predefined values of $\delta$: $\delta \in \{0\ 5\ 10\ 15\}$ nm (respectively bottom, $\delta=0$ nm, to top, $\delta=15$ nm, in each figure).

FIG. 7 shows graphs depicting the learned forces for the four considered values of $\delta$ along with the scaled reference setpoint profile (dashed curves). FIG. 8 shows the corresponding error signals: the original error signals (dotted) and the error signals after applying the learned force (solid). It can be seen that the error signals are reduced up to a level defined by the threshold value $\delta$ (shown in each of the graphs in FIG. 8 by a horizontal dashed line). It can be seen (FIG. 7) that as $\delta$ is chosen to be smaller, the learned force subsequently contains higher noise levels (see in particular the region of scanning, i.e. the region of constant velocity, roughly between 0.05 and 0.15 seconds, for the smaller values of $\delta$). This process continues by further decreasing the value of $\delta$.

In addition to the avoidance or reduction in (non-repetitive) noise amplification, the approach of using non-linear filtering of error data in a learning control scheme may also allow a better balance to be achieved between performance of the learning algorithm (i.e. how quickly the algorithm converges to a desired accuracy), achieved with high learning gains, and stability of the algorithm (i.e. robustness to model uncertainty). Using a linear learning algorithm (i.e. without the use of a non-linear filter as described above for embodiments of the present invention), high gain and stability are difficult to achieve together. Using a learning algorithm with a non-linear filter, it is possible to achieve fast convergence with stability.

Figure 9:
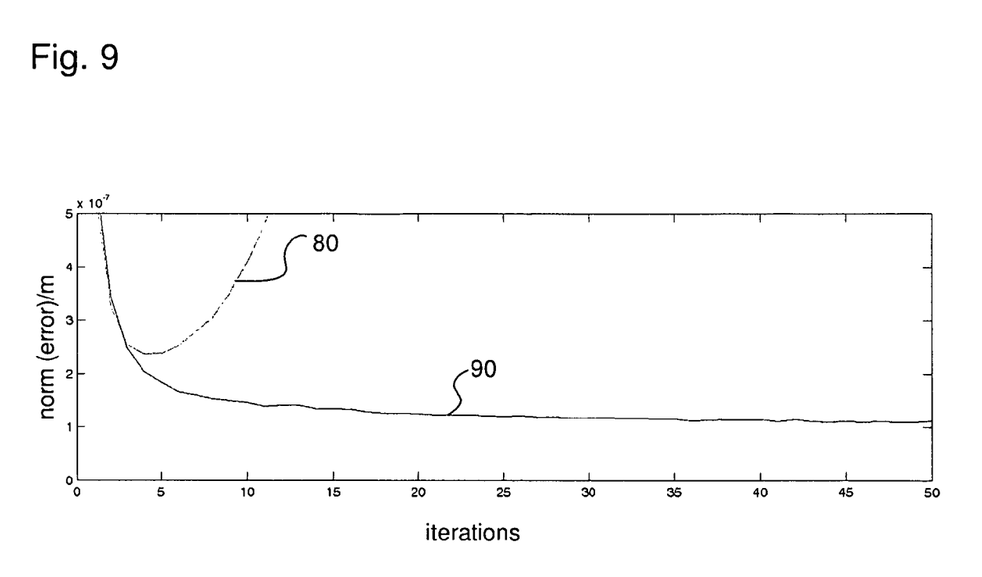
FIG. 9 illustrates the high learning gain high stability properties of the feedforward control system with non-linear filter.

FIG. 9 compares the performance of a linear learning algorithm (curve 80) with a non-linear filtered learning algorithm according to an embodiment of the present invention (curve 90—the actual filter used corresponding to that discussed above with reference to the function $\phi(x)$). As can be seen, both algorithms achieve a similar convergence speed for the error (the Euclidean norm on the error colon $e_y(k)$ is used as a performance measure) for the first three iterations but the error for the linear learning algorithm becomes unstable thereafter (eventually blowing up). The non-linear filtered algorithm, however, achieves stable convergence (the error continues to decrease, albeit more slowly than during the first few iterations when the error magnitude was still large). This behavior illustrates the self-adapting properties of the non-linear learning gain filter in comparison with the high-gain linear learning filter. The non-linear filter balances convergence rates with stability properties and keeps on decreasing the error norm. Mathematically speaking, the filter reduces noise contributions corresponding to small singular values of the learning gain matrix L, which otherwise limit the convergence speed of the learning algorithm in terms of stability.

Embodiments of the present invention may be applied in the field of lithographic motion systems like the control of reticle stages or substrate tables, as mentioned above. The system may also be used in stages for electron microscope imaging, MagLev stages for laser cutting, or repetitive motion systems in a more general perspective. Other fields of application include, for example, UHP-lamp control where an iterative learning control scheme has previously been introduced.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 355, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

What is claimed is:

1. A method of obtaining improved feedforward data for a feedforward control system to move a component through a setpoint profile, said setpoint profile comprising a plurality of target states of said component each to be substantially attained at one of a corresponding sequence of target times, said method comprising:
   a) moving said component with the feedforward control system according to the setpoint profile using a first set of feedforward data;
   b) measuring a state of said component at a plurality of times during said moving;
   c) comparing the measured states with corresponding target states defined by said setpoint profile to obtain a set of errors;
   d) comparing the set of errors to a threshold and determining if the set of errors or a subset of the set of errors are above the threshold;
   e) filtering said set of errors with a dead zone non-linear filter if the set of errors or the subset of the set of errors are above the threshold;
   f) generating improved feedforward data based on the filtered errors, said improved feedforward data being usable by said feedforward control system during a subsequent moving of said component more accurately through the setpoint profile;
   g) repeating steps (a) to (f) iteratively, using the most recently obtained improved feedforward data instead of the first set of feedforward data, until it is determined that the set of errors or the subset of the set of errors obtained in step (c) are below the threshold.

2. The method according to claim 1, wherein the filtering is dependent on the amplitudes of said set of errors.

3. The method according to claim 2, wherein the filtering includes suppressing errors of small amplitude more than errors of larger amplitude.

4. The method according to claim 1, wherein the filtering includes decomposing the error signal into a plurality of discrete frequency bands and individually applying a selected filtering operation to each of the bands.

5. The method according to claim 1, wherein the plurality of times during the movement at which the state of the component is measured correspond to at least a subset of said plurality of target times.

6. The method according to claim 1, wherein said target states include at least one of the following: target positions of said component, target velocities of said component, and target accelerations of said component.

7. The method according to claim 1, wherein said filter is configured to pass contributions to the errors that have a magnitude greater than a predefined noise bound and to reject other contributions.

8. The method according to claim 1, wherein if the set of errors or the subset of the set of errors are below the predetermined threshold, the first set of feedforward data is used as improved feedforward data during a subsequent moving of said component.

9. A method of obtaining improved feedforward data for a feedforward control system to move a component through a setpoint profile, said setpoint profile comprising a plurality of target states of said component each to be substantially attained at one of a corresponding sequence of target times, said method comprising:
   a) moving said component with the feedforward control system according to the setpoint profile using a first set of feedforward data;
   b) measuring a state of said component at a plurality of times during said moving;
   c) comparing the measured states with corresponding target states defined by said setpoint profile to obtain a set of errors;

d) filtering said set of errors with a non-linear filter; and e) generating improved feedforward data based on the filtered errors, said improved feedforward data being usable by said feedforward control system during a subsequent moving of said component more accurately through the setpoint profile, wherein said set of errors is represented by an array of data points $\underline{e}_y(i)$, where $0 \leq i \leq n$, n is the number of samples in the set, said filter is represented by an amplitude-dependent filter matrix $\Phi(\underline{e}_y(i))$, and step (d) corresponds to a multiplication of $\Phi(\underline{e}_y(i))$ by $\underline{e}_y(i)$.

10. The method according to claim 9, wherein $\Phi(\underline{e}_y(i))$ is defined as follows:

$$\Phi(e_y) = \begin{bmatrix} \phi(e_y(1)) & 0 & \cdots & 0 \\ 0 & \phi(e_y(2)) & \cdots & 0 \\ 0 & \vdots & \ddots & \vdots \\ 0 & 0 & \cdots & \phi(e_y(n)) \end{bmatrix}$$

with $$\phi(x) = \varepsilon(x) - \frac{\delta \varepsilon(x)}{|x|}$$

and $$\varepsilon(x) = \begin{cases} 1, & \text{if } |x| \geq \delta \\ 0, & \text{if } |x| < \delta. \end{cases}$$

11. A lithographic projection apparatus arranged to project a pattern from a patterning device onto a substrate, comprising:

(a) a movable support configured to support a component; and (b) a system configured to move said movable support through a setpoint profile comprising a plurality of target states of said movable support, each to be substantially attained at one of a corresponding sequence of target times, said system comprising:

(i) a displacement device configured to move said movable support according to said setpoint profile;

(ii) a feedforward control system configured to control said displacement device using a first set of feedforward data;

(iii) a measuring system configured to measure the state of said component at a plurality of times during movement of said movable support;

(iv) a comparison device configured to compare the measured states with corresponding target states to obtain a set of errors, said set of errors being compared to a threshold to determine if the set of errors or a subset of the set of errors are above the threshold;

(v) a dead zone non-linear filter configured to filter said set of errors if the set of errors or a subset of the set of errors are above the threshold;

(vi) a feedforward data generating device arranged to generate modified feedforward data based on the filtered set of errors, said modified feedforward data being usable by said feedforward control system during a subsequent moving of the movable support to control said displacement device to more accurately move said movable support through the setpoint profile, said system being configured to iteratively use the most recently obtained modified feedforward data instead of the first set of feedforward data to determine improved feedforward data until it is determined that the set of errors or the subset of the set of errors obtained by the comparison device are below the threshold.

12. The lithographic apparatus according to claim 11, wherein said component is the substrate or the patterning device.

13. A device manufacturing method, comprising:

(a) projecting a pattern from a patterning device onto a substrate;

(b) supporting a component with a movable support;

(c) moving the movable support with a feedforward control system through a setpoint profile using a first set of feedforward data, said setpoint profile comprising a plurality of target states of said movable support, each to be substantially attained at one of a corresponding sequence of target times;

(d) measuring a state of the component at a plurality of times during said moving;

(e) comparing the measured states with corresponding target states to obtain a set of errors;

(f) comparing the set of errors to a threshold and determining if the set of errors or a subset of the set of errors are above the threshold;

(g) filtering the set of errors with a dead zone non-linear filter if the set of errors or a subset of the set of errors are above the threshold;

(h) generating improved feedforward data based on the filtered set of errors;

(i) moving the movable support through the setpoint profile using the improved feedforward data;

(j) repeating steps (c) to (h) iteratively, using the most recently obtained improved feedforward data instead of the first set of feedforward data, until it is determined that the set of errors or subset of the set of errors obtained in step (e) are below the threshold.

14. The method according to claim 13, wherein the component is the substrate or the patterning device.

15. The method according to claim 13, wherein said set of errors is represented by an array of data points $\underline{e}_y(i)$, where $0 \leq i \leq n$, n is the number of samples in the set, said filter is represented by an amplitude-dependent filter matrix $\Phi(\underline{e}_y(i))$, and step (d) corresponds to a multiplication of $\Phi(\underline{e}_y(i))$ by $\underline{e}_y(i)$.

16. The lithographic apparatus according to claim 11, wherein said set of errors is represented by an array of data points $\underline{e}_y(i)$, where $0 \leq i \leq n$, n is the number of samples in the set, said filter is represented by an amplitude-dependent filter matrix $\Phi(\underline{e}_y(i))$, and step (d) corresponds to a multiplication of $\Phi(\underline{e}_y(i))$ by $\underline{e}_y(i)$.

* * * * *